United States Patent [19]

Claasen et al.

[11] 4,435,774
[45] Mar. 6, 1984

[54] METHOD OF AND ARRANGEMENT FOR CALCULATING THE DISCRETE FOURIER TRANSFORM BY MEANS OF TWO CIRCULAR CONVOLUTIONS

[75] Inventors: Theodoor A. C. M. Claasen; Wolfgang F. G. Mecklenbräuker, both of Eindhoven, Netherlands

[73] Assignee: U.S. Philips Corporation, New York, N.Y.

[21] Appl. No.: 243,228

[22] Filed: Mar. 13, 1981

[30] Foreign Application Priority Data

Mar. 17, 1980 [NL] Netherlands .......................... 8001559

[51] Int. Cl.³ .......................................... G06F 15/332
[52] U.S. Cl. ................................................... 364/726
[58] Field of Search ........................................ 364/726

[56] References Cited

U.S. PATENT DOCUMENTS

4,282,579  8/1981  Speiser et al. ..................... 364/726

OTHER PUBLICATIONS

Agarwal et al., "Fast Convolution Using Fermat Number Transforms with Applications to Digital Filtering", *IEEE Trans. on Acoustics, Speech & Signal Processing* vol. ASSP-22, No. 2, Apr. 1974, pp. 87–97.

Kolba, "A Prime Factor FFT Algorithm Using High-Speed Convolution", *IEEE Trans. on Acoustics, Speech, and Signal Processing* vol. ASSP-25, No. 4, Aug. 1977, pp. 281–294.

*Primary Examiner*—David H. Malzahn
*Attorney, Agent, or Firm*—James J. Cannon, Jr.

[57] ABSTRACT

Method of a N-point discrete Fourier transform. The original set, consisting of N input signal values $\{a(k)\}k=0,1,2,\ldots N-1$ is converted into two sets of signal values $\{b_1(q)\}q=1,2,\ldots M$ and $\{b_2(q)\}q=1,2,\ldots M$, which each comprise $M=(N-1)/2$ signal values, each value being a linear combination of two of the original input signal values $a(k)$. These sequences are circularly convolved with the impulse response $h_1(v)=\alpha\cos((2\pi/N) g^v)$ and $h_2(v)=j\beta\sin((2\pi/N) g^v)$, respectively, for generating a set of third data elements $y_1(p)$ and a set of fourth signal values $y_2(p)$. Herein N is a prime and $\alpha,\beta$ and g represent constants and it holds that p, $v=1,2,\ldots M$, whereas $j=\sqrt{-1}$. The desired output signal value can be obtained by means of a linear combination of the signal values $y_1(p)$, $y_2(p)$ and $a(0)$.

3 Claims, 11 Drawing Figures

| n\k | 0 | 1 | 2 | 3 | 4 | 5 | 6 | 7 | 8 | 9 |
|---|---|---|---|---|---|---|---|---|---|---|
| 0 | 1 | 1 | 1 | 1 | 1 | 1 | 1 | 1 | 1 | 1 |
| 1 | 1 | $E$ | $E^2$ | $E^3$ | $E^4$ | $E^5$ | $E^6$ | $E^7$ | $E^8$ | $E^9$ |
| 2 | 1 | $E^2$ | $E^4$ | $E^6$ | $E^8$ | 1 | $E^2$ | $E^4$ | $E^6$ | $E^8$ |
| 3 | 1 | $E^3$ | $E^6$ | $E^9$ | $E^2$ | $E^5$ | $E^8$ | $E$ | $E^4$ | $E^7$ |
| 4 | 1 | $E^4$ | $E^8$ | $E^2$ | $E^6$ | 1 | $E^4$ | $E^8$ | $E^2$ | $E^6$ |
| 5 | 1 | $E^5$ | 1 | $E^5$ | 1 | $E^5$ | 1 | $E^5$ | 1 | $E^5$ |
| 6 | 1 | $E^6$ | $E^2$ | $E^8$ | $E^4$ | 1 | $E^6$ | $E^2$ | $E^8$ | $E^4$ |
| 7 | 1 | $E^7$ | $E^4$ | $E$ | $E^8$ | $E^5$ | $E^2$ | $E^9$ | $E^6$ | $E^3$ |
| 8 | 1 | $E^8$ | $E^6$ | $E^4$ | $E^2$ | 1 | $E^8$ | $E^6$ | $E^4$ | $E^2$ |
| 9 | 1 | $E^9$ | $E^8$ | $E^7$ | $E^6$ | $E^5$ | $E^4$ | $E^3$ | $E^2$ | $E$ |

FIG.1

| n\k | 0 | 1 | 2 | 3 | 4 | 5 | 6 |
|---|---|---|---|---|---|---|---|
| 0 | 1 | 1 | 1 | 1 | 1 | 1 | 1 |
| 1 | 1 | $E$ | $E^2$ | $E^3$ | $E^4$ | $E^5$ | $E^6$ |
| 2 | 1 | $E^2$ | $E^4$ | $E^6$ | $E$ | $E^3$ | $E^5$ |
| 3 | 1 | $E^3$ | $E^6$ | $E^2$ | $E^5$ | $E$ | $E^4$ |
| 4 | 1 | $E^4$ | $E$ | $E^5$ | $E^2$ | $E^6$ | $E^3$ |
| 5 | 1 | $E^5$ | $E^3$ | $E$ | $E^6$ | $E^4$ | $E^2$ |
| 6 | 1 | $E^6$ | $E^5$ | $E^4$ | $E^3$ | $E^2$ | $E$ |

FIG.2

$$[z(g^m \bmod N) - A_0] = [E^{g^{N+m-i}}] \cdot [a(g^{N-i} \bmod N)]$$

$$\begin{bmatrix} z(3) - a_0 \\ z(2) - a_0 \\ z(6) - a_0 \\ z(4) - a_0 \\ z(5) - a_0 \\ z(1) - a_0 \end{bmatrix} = \begin{bmatrix} E^3 & E & E^5 & E^4 & E^6 & E^2 \\ E^2 & E^3 & E & E^5 & E^4 & E^6 \\ E^6 & E^2 & E^3 & E & E^5 & E^4 \\ E^4 & E^6 & E^2 & E^3 & E & E^5 \\ E^5 & E^4 & E^6 & E^2 & E^3 & E \\ E & E^5 & E^4 & E^6 & E^2 & E^3 \end{bmatrix} \cdot \begin{bmatrix} a(1) \\ a(5) \\ a(4) \\ a(6) \\ a(2) \\ a(3) \end{bmatrix}$$

METHOD OF AND ARRANGEMENT FOR CALCULATING THE DISCRETE FOURIER TRANSFORM BY MEANS OF TWO CIRCULAR CONVOLUTIONS

BACKGROUND OF THE INVENTION (1). Field of the Invention

The invention relates to a method of converting a set of N first signal values into a set of second signal values, the relationship between these first and second signal values being given by an N-point discrete Fourier transform, N being a prime.

The invention also relates to an arrangement for carrying out the above-mentioned method and this arrangement will be denoted a Discrete-Fourier-Transform-arrangement hereinafter.

(2). Description of the Prior Art

An N-point discrete Fourier transform is a name for a special relationship between the elements of a set of N signal values $\{a(k)\}k=0,1,2,\ldots N-1$ and a signal value $z(n)$ of a set of N signal value $\{z(n)\}n=0,1,2,3,\ldots N-1$. This relationship is defined as follows:

$$z(n) = A \sum_{k=0}^{N-1} a(k) E^{kn} \quad (1)$$

In this expression n may assume each of the integral numbers of the field $\{0, 1, 2, 3, \ldots, N-1\}$. Each quantity E and A may assume two values. In the first case the quantities may be defined by the relations:

$$E = \exp(-j2\pi/N)$$
$$A = 1 \quad (2)$$

In this case expression (1) is said to express in a narrower sense a discrete Fourier transform of the set of signal values $\{a(k)\}k=0, 1, 2, \ldots, N-1$.

This discrete Fourier transform in the narrow sense is usually abbreviated DFT. In this case each signal value $a(k)$ may represent the amplitude of a sample of a time-continuous complex signal which is sampled at a frequency $1/T$. Each signal value $z(n)$ then represents the amplitude and the phase of the frequency component $n/(NT)$ of the original complex signal.

In the second case E and A may be defined by the relations:

$$E = \exp(+j2\pi/N)$$
$$A = 1/N \quad (3)$$

In this case expression (1) is sometimes said to be the inverse discrete Fourier transform of the set of values $\{a(k)\}K=0,1,2,\ldots N-1$. This inverse discrete Fourier transform is usually abbreviated IDFT. In this case a signal value $a(k)$ may represent the amplitude and the phase of the frequency component $k/(NT)$ of a time-continuous complex signal which is sampled at a frequency $1/T$ and each signal value $z(n)$ then represents the amplitude of such a sample.

As will be apparent from expression (1), a large number of arithmetic operations such as additions and multiplications must be carried out to convert the set of data elements $\{a(k)\}k=0, 1, 2, \ldots N-1$ into a signal value $z(n)$ are calculated using expression (1), a total of NZ complex multiplications and $N(N-1)$ complex additions are required. For high values of N this means that the computation of a signal value $z(n)$ not only takes much computational time but also requires very elaborate equipment.

Over the years a number of methods have been developed to compute such a signal value $z(n)$. Depending on the number of arithmetic operations required, the known methods may be arranged into two categories namely the a. the rapid methods
b. the direct methods.

The most well-known rapid method is the so-called "Fast Fourier Transform" abbreviated FFT. This method is extensively described in References 1 and 2 (see later). A novel rapid method has been proposed more recently by Winograd. This novel method is described in Reference 3. These rapid methods require a number of arithmetic operations which is proportional to $N \log N$. These known rapid methods however have the drawback that they are only effective when N is a number which can be written as the product of a number of integers and when all, or nearly all, the N signal values $z(n)$ must be calculated. It should further be noted that a Discrete-Fourier-Transform-arrangement the structure of which is based on one of these rapid methods can only be implemented by means of digital circuits.

The direct methods are based upon one of the following algorithms:

the Goertzel algorithm, which is described on pages 287-289 of Reference 2. A discrete-Fourier-transform arrangement whose structure is based on this Goertzel algorithm is formed by a recursive discrete filter which for pratical reasons can, however, only be implemented digitally.

the Bleustein algorithm, also called the "Chirp-z-transform"-algorithm, which is described on pages 321-326 of Reference 2. A discrete-Fourier-transform arrangement whose structure is based upon this algorithm comprises a finite impulse response discrete filter (a so-called FIR-filter). Before the signal values $a(k)$ are applied to this filter they are multiplied by a so-called chirp signal. Also the signal values produced by this filter are multiplied by such a chirp signal in order to obtain the desired signal values $z(n)$.

the Rader algorithm, also called "prime factor" algorithm, which is described in References 4 and 5. For this algorithm it is that N is a prime. With is algorithm the set of signal values $\{a(k)\}k=0,1,2,\ldots N-1$ is divided into two groups. The first group only comprises the signal value $a(0)$, while the second group comprises the remaining signal values $\{a(k)\}k=1,2,\ldots N-1$. For the generation of the signal values $z(0)$ and N-signal values of the set $\{a(k)\}k=0,1,2,\ldots N-1$ are accumulated.

For the generation of the other signal values of the set $\{z(n)\}n=1,2,\ldots N-1$ the values of the set $\{a(k)\}k=1,2,\ldots N-1$ are permuted. That is to say, a set of signal values $\{b(i)\}i=1,2,\ldots N-1$ is generated, the signal value $b(i)$ being equal to the signal value $a(g^i \bmod N)$. Herein g represents a constant which is equal to a primitive root of the field consisting of the numbers $1, 2, 3, \ldots N-1$ (see Reference 6). In accordance with this Radar algorithm, the set of signal values $\{b(i)\}i=1,2,\ldots N-1$ thus obtained is now further converted into a set of signal values $\{y(m)\}m=1,2,\ldots N-1$, wherein the relationship between the signal value $y(m)$ and the said set of signal values $b(i) i=1,2,\ldots N-1$ is defined by:

$$y(m) = \sum_{i=1}^{N-1} b(i) E^{gi+m} \quad (4)$$

When now the signal value $a(0)$ is added to a data element $y(m)$ and the sum thus obtained multiplied by the factor $A$, the signal value $z(n)=A[y(m)+a(0)]$ is obtained, whose number $n$ is defined by the expression:

$$n = g^m \bmod N \quad (5)$$

In a discrete-Fourier-transform arrangement implementing this Rader algorithm, the conversion operation defined in expression (4) is implemented in a discrete filter having a filter length $N-1$. The discrete filter meant here and also the discrete filter included in the discrete-Fourier-transform arrangement whose structure is based upon the Bluestein-algorithm may be a "sampled data filter," or a "digital filter." For a definition of these last-mentioned terms reference is made to Reference 7.

The number of arithmetic operations required with these direct methods is proportional to $N^2$. This number of operations decreases when the number of signal values $z(n)$ to be determined increases. It should further be noted that the Goertzel algorithm and also the Bluestein algorithm may be used for each value of $N$, whereas, the Rader algorithm requires that $N$ is a prime.

SUMMARY OF THE INVENTION

It is an object of the invention to improve the Rader-algorithm, which improvement results in a considerable saving in material for a hardware implementation of this algorithm on the one hand, and, which on the other hand is extremely suitable, even for high values of $N$, for programming in order to compute the signal values $z(n)$ by means of a microprocessor.

In this Rader algorithm in which for the conversion of a set of first signal values $\{a(k)\} k=0,1,2,\ldots N-1$ into a number of predetermined second signal values of a set of second signal values $\{z(n)-Aa(0)\}\ n=1,2,\ldots N-1$, $N$ being a prime and $A$ a constant, and in which the relationship between a signal value $z(n)$ and the first signal values is given by the $N$-point discrete Fourier transform, and which comprises the following steps:

- a permuting step for generating a set of third signal values $\{b(i)\} i=1,2,\ldots N-1$, which is formed by a permuted version of the first signal values of the first set $\{a(k)\} k=1,2,\ldots N-1$.
- a conversion step for converting the set of third signal values $\{b(i)\} i=1,2,\ldots N-1$ into the desired signal values of the set of the second signal values $\{z(n)-Aa(0)\} n=1,2,\ldots N-1$; this conversion step according to the invention comprising the following steps:
- a first generating step for generating a set of fourth signal values $\{b_1(q)\} q=1,2,\ldots M$, in which $M=(N-1)/2$ and $b_1(q)$ is equal to $b(q)+b(M+q)$;
- a second generating step for generating a set of fifth signal values $\{b_2(q)\} q=1,2,\ldots M$, $b_2(q)$ being equal to $b(q)-b(M+q)$;
- a first auxiliary conversion step for converting the set of fourth signal values into a sixth signal value $y_1(p)$ of a set of sixth signal values $\{y_1(p)\} p=1,2,\ldots M$, in accordance with the expression:

$$y_1(p) = \alpha \sum_{q=1}^{M} b_1(q) \cos\left(\frac{2\pi}{N} g^{1+\{(p-q) \bmod N\}}\right)$$

in which $\alpha$ represents a constant and in which $g$ is a positive integer which is equal to a primitive root of the field consisting of the numbers $1, 2, 3, \ldots N-1$;

- a second auxiliary conversion step for converting the set of fifth signal values into a seventh signal value $y_2(p)$ of a set of seventh signal values $\{y_2(p)\} p=1,2,\ldots M$, in accordance with the expression:

$$y_2(p) = j\beta \sum_{q=1}^{p} b_2(q) \sin\left(\frac{2\pi}{N} g^{1+\{(p-q) \bmod N\}}\right) +$$

$$-j\beta \sum_{q=p+1}^{M} b_2(q) \sin\left(\frac{2\pi}{N} g^{1+\{(p-q) \bmod N\}}\right)$$

wherein $\beta$ represents a constant and wherein $j=\sqrt{-1}$; and

- a combining step for generating the second signal value $z(n)-Aa(0)$ in accordance with the expression:

$$z(n)-Aa(0) = y_1(p) + (-1)^S y_2(p)$$

where
$p=1,2,\ldots M$
$M=(N-1)/2$
wherein for $n=g^p \bmod N$ it holds that $S=+1$ and wherein for $n=g^{M+p} \bmod N$ it holds that $S=0$.

It is now achieved that the number of multiplications required with the Rader-algorithm is reduced by a number which is at least equal to $M=(N-1)/2$. In the Discrete-Fourier-transform arrangement whose structure is based upon the method according to the invention there is also a gain in storage capacity. If it is assumed that each first and each second auxiliary conversion step is realized with a discrete FIR-filter, then each filter will only have a filter length $(N-1)/2$.

References

1. An Algorithm for the Machine Calculation of Complex Fourier Series; J. W. Cooley, J. W. Tukey; Mathematics of Computation, Vol. 19, no. 90, 1965, pages 297-301.
2. Digital Signal Processing; A. V. Oppenheim, R. W. Schafer; Prentice-Hall, inc, Englewood Cliffs, N.J. 1975.
3. On computing the Discrete Fourier Transform; S. Winograd; Proceedings of the National Academy of Science U.S.A., Vol. 73, no. 4 April 1976, pages 1005-1006.
4. Discrete Fourier Transforms When the Number of Data Samples is Prime; C. M. Rader; Proceedings of the IEEE, Vol. 56, June 1968, pages 1107-1108.
5. Signal Processing with Combined CCD and Digital Techniques; The Impact of New Technologies in Signal Processing; H. J. Whitehouse, J. M. Speiser, IEEE Conference Publications No. 144, pages 61-65.
6. Number Theory; J. Hunter; (University Mathematical Texts), Oliver and Boyd, London 1964.

7. Terminology in Digital Signal Processing; IEEE Transactions on Audio and Electroacoustics, Vol. AU-20, No. 5, December 1972, pages 322-337.
8. Digital Processing of Signals; B. Gold, C. M. Rader; McGraw-Hill Book Company 1969,
9. Arithmatic Operations in Digital Computers; R. K. Richards, D. Van Nostrand Company, INC, 1957.
10. The Art of Computer Programming; D. E. Knuth; Semi numerical algorithms, Vol. II, Adison Wesley Publishing Company, 1969.
11. Theory and Application of Digital Signal Processing; L. R. Rabiner, B. Gold; Prentice-Hall, inc., Englewood Cliffs, N.J., 1975.

Definitions and Symbols

1. $\{e(r)\}r=0,1,2,3,\ldots N$, represents a set of signal values wherein the signal value having number r has the value $e(r)$.
2. mod N, represents the modulo N operation. Of two numbers $\xi$ and $\zeta$ it is said that they are congruent modulo N when $\xi=\zeta+\gamma N$. This will be written as: $\xi$ mod $N=\zeta$. All quantities $N, \xi, \zeta, \gamma$ may be complex polynominals.
3. $j=\sqrt{-1}$.
4. A discrete signal $\{f(r)\}r=-\infty,\ldots -1, 0, 1, \ldots \infty)$ is considered to be complex when each component contains in general a real and an imaginary part, so that it holds that: $f(r)=f_1(r)+jf_2(r)$. The components $a(k)$ and $z(n)$ will generally be complex.

SHORT DESCRIPTION OF THE FIGURES

FIG. 1 shows the matrix $[E^{kn}]$ for $N=10$;

FIG. 2 shows the matrix $[E^{kn}]$ for N is equal to the prime 7;

Figure 11:
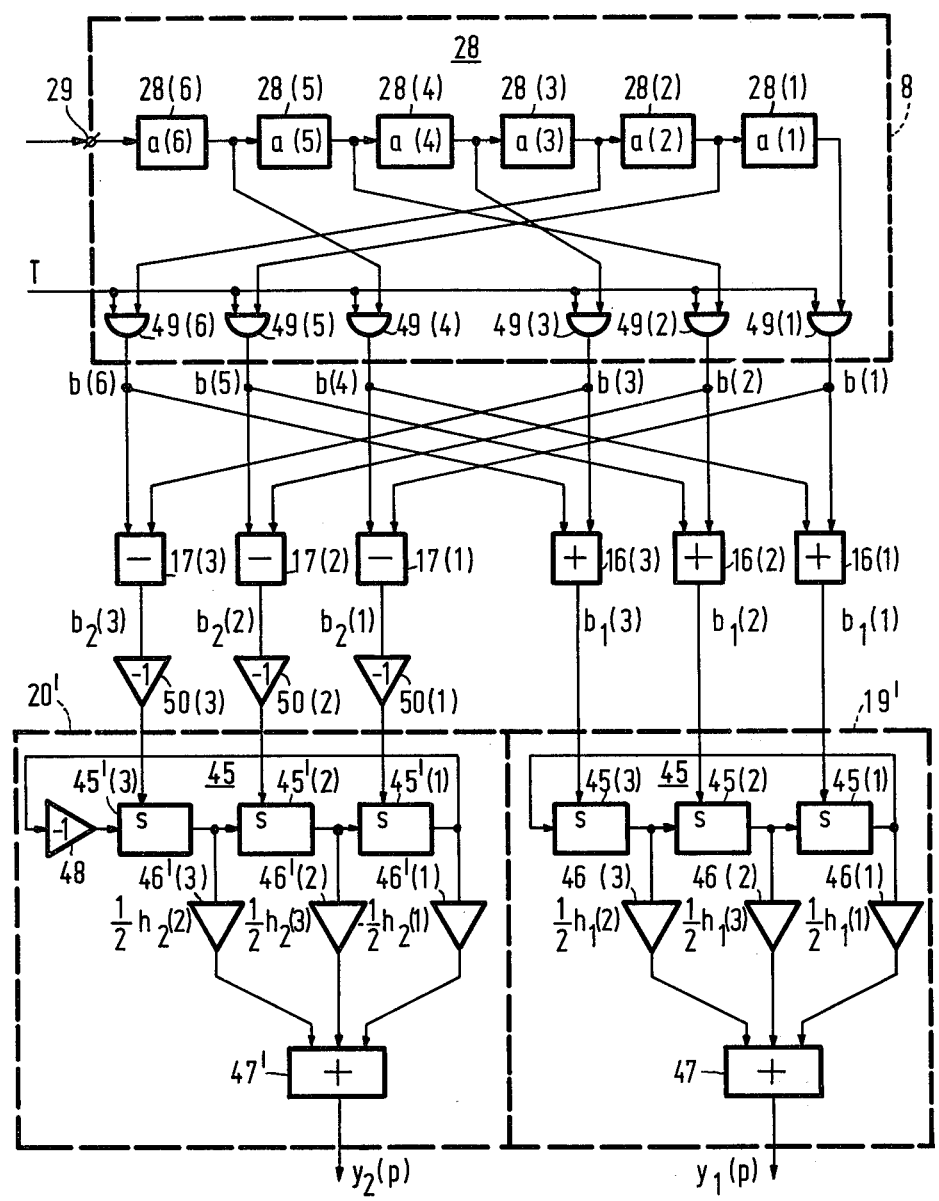

FIG. 11 shows a circuit in which the permuting arrangement produces the signal values of the set $\{b(i)\}i=1,2,\ldots N-1$ simultaneously, and wherein the switching arrangement 13, the adder 16, the subtracter 17 and the circular filters 19 and 20 are implemented in an alternative way.

DESCRIPTION OF THE EMBODIMENTS

(1) Introduction

In this paragraph the basic concept of the aforementioned Rader algorithm such as it is concisely described in Reference 4 will be discussed. In the first place it should be noted that the expression (1) may alternatively be written in the following matrix form:

$$[z(n)]=A[E^{kn}]\cdot[a(k)] \quad (6)$$

$[z(n)]$ represents a column matrix consisting of the set of signal values $\{z(n)\}n=0,1,\ldots N-1$;
$[a(k)]$ represents a column matrix consisting of the set of signal values $\{a(k)\}k=0,1,\ldots N-1$;
$[E^{kn}]$ represents an $N\times N$ matrix consisting of the values $E^{kn}$, more particularly n represents the number of the row and k the number of the column.

When $kn=\zeta+\gamma N$, it holds that:

$$E^{kn}=E^\zeta$$

For $N=10$, this matrix $[E^{kn}]$ is shown by way of example in FIG. 1. From this Figure it can be seen that not each row contains all the possible powers of E. This is the case for the rows numbered $n=0$, $n=2$, $n=4$, $n=5$, $n=6$ and $n=8$. As can be seen from, for example, FIG. 2, which shows the matrix $[E^{kn}]$ for $N=7$, each row of this matrix having a number different from $n=0$ does contain all the possible powers of E if N is a prime.

As will now be further explained, this matrix property which is associated with the fact that N is a prime renders it possible to carry out the most important part of the required computations in a perfectly advantageous manner. First it is noted that expression (1) may also be written as follows:

$$z(0) = A \sum_{k=0}^{N-1} a(k) \quad (7a)$$

$$z(n) - Aa(0) = A \sum_{k=1}^{N-1} a(k)E^{kn} \text{ for } n = 1, 2, 3, \ldots N-1 \quad (7b)$$

As N is a prime, there is a number g (a so-called primitive root; see Reference 6) such that the set of numbers $i=1,2,3,\ldots N-1$ is unambiguously mapped onto the set $k=1,2,3,\ldots N-1$, this mapping being defined as follows:

$$k=g^i \mod N \quad (8)$$

More particularly it then appears that:

$$N-1=g^{N_2-1} \mod N$$

As regards the primitive root g it is noted that a set of numbers may have more than one primitive root. By way of example it is noted that for $N=3$ there is only one primitive root, namely $g=2$. For $N=5$ there are the two primitive roots $g=2$ and $g=3$, whereas for $N=7$ there are the two primitive roots $g=3$ and $g=5$.

When now the set of signal values $\{a(k)\}k=1,2,\ldots N-1$ and the set of signal values $\{z(n)\}n=1,2,\ldots N-1$ are permuted in accordance with expression (8), expression (7b) becomes:

$$z(g^m \mod N) - Aa(0) = A \sum_{i=1}^{N-1} a(g^i \mod N)E^{g^{m+i}} \quad (9)$$

wherein $m=1,2,3,\ldots N-1$
or, which amounts to the same:

$$z(g^m \mod N) - Aa(0) = A \sum_{i=1}^{N-1} a(g^{N-i} \mod N)E^{g^{N+m-i}} \quad (10)$$

Figures 3, 4:
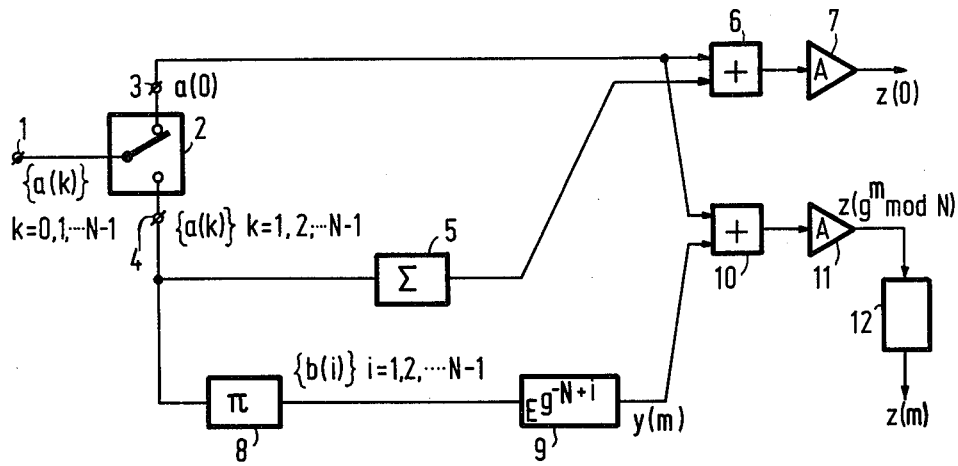
FIG. 3 shows the equation (10) in the form of a matrix for the case $N=7$ and $g=3$.
FIG. 4 shows a Discrete Fourier-transform arrangement whose structure is an implementation of the Rader-algorithm.

Just like expression (1), also this expression (10) may be written in matrix form, this being depicted in FIG. 3, where N=7 and g=3.

As will be clear from FIG. 3 the elements of a row having the number n+1 are obtained by shifting the elements of the preceding row of number n in a circular way one position to the right. Expression (10) is sometimes called a circular convolution.

The most important aspect of the Rader algorithm is that this circular convolution can be realized in a particularly simple manner by means of a non-recursive discrete circular filter having a finite impulse response of length N−1.

(2) A Discrete-Fourier-Transform-arrangement based on the Rader-algorithm

FIG. 4 shows schematically an embodiment of a Discrete-Fourier-Transform-arrangement whose structure is based on this Rader-algorithm. The arrangement shown in that Figure has an input 1 to which a set of signal values $\{a(k)\}k=0,1,\ldots N-1$ is applied. It is assumed that the signal values a(k) are complex quantities and that these elements occur sequentially. These signal values are applied to a switching arrangement 2, which is shown symbolically only and which has two outputs 3 and 4. This switching arrangement 2 is controlled such that the signal value a(0) which as the first element of the set is applied to input 1 is routed to the output 3 and that the remaining signal values of this set are routed to the output 4. The set of signal values $\{a(k)\}k=1,2,\ldots N-1$, which is produced at the output 4 of the switching arrangement 2 is applied to an accumulator 5, which accumulates the signal value of this set. In adder 6 the sum produced by the accumulator 5 is increased by a(0) and the sum thus obtained is multiplied by the factor A in a multiplier 7. At the output of this multiplier 7 the signal value z(0) defined in expression (7a) is produced.

The set of signal value produced at output 4 of the switching arrangement 2 is not only applied to accumulator 5 but also to a permuting arrangement 8. This permuting arrangement 8 changes the order of occurrence of the data elements a(k) within the set $\{a(k)\}k=1,2,\ldots N-1$ and produces a set of signal values $\{b(i)\}i=1,2,\ldots N-1$. It will be assumed here that these signal values b(i) also occur sequentially. The operation of this permuting arrangement 8 is such that for each signal value b(i) it holds that $$b(i)=a(g^{N-i} \bmod N)$$

The signal values b(i) thus obtained are then applied to a circular non-recursive discrete filter 9, having the finite impulse response $h(i)=E^g_{-N+1}$. This filter 9 produces the elements $z(g^m \bmod N)-Aa(0)$ defined in expression (10). In an adder 10, each element is augmented by a(0) and the sum thus obtained is multiplied in a multipler 11 by the factor A, to achieve each signal value $z(g^m \bmod N)$. This last signal value may optionally be applied to a second permuting arrangement 12 to be placed in the desired (proper!) sequence together with the other signal values produced by the multiplying arrangement 11.

(3) The method according to the invention

As mentioned in the foregoing, expression (10) represents a circular convolution. With the following identities $$y(m)=[z(g^m \bmod N)-Aa(0)]/A$$

$$b(i)=a(g^{N-i} \bmod N) \qquad (11)$$

$$h(v)=E^g_v$$

where $v=1,2,\ldots N-1$
expression (10) may be written in the circular convolution form shown in paragraph 6.2 of Reference 8 (pages 166 and 167 in particular). More particularly, expression (10) then changes into $$y(m) = \sum_{i=1}^{N-1} b(i) h(1 + \{(m - i) \bmod(N - 1)\}) \qquad (12)$$

This expression (12) is known from polynominal theory (see, for example, Reference 10). This theory teaches the following: Let the signal values y(m) represent the coefficients of a polynominal Y(u) for which it holds that:

$$Y(u) = \sum_{m=1}^{N-1} y(m)u^{m-1} \qquad (13)$$

Let further the signal values b(i) represent the coefficients of a polynominal B(u) for which it holds that:

$$B(u) = \sum_{i=1}^{N-1} b(i)u^{i-1} \qquad (14)$$

and let in a corresponding manner the filter coefficients h(v) represent the coefficients of a polynominal H(u) for which it holds that:

$$H(u) = \sum_{v=1}^{N-1} h(v)u^{v-1} \qquad (15)$$

then it can be proved (see also Reference 10) that when the coefficients y(m) are defined by expression (12) it then holds that $$Y(u)=B(u)H(u) \bmod (u^{N-1}-1) \qquad (16)$$

Since N is a prime, it holds that N−1 is an even number, so that:

$$(u^{N-1}-1)=(u^M-1)(u^M+1)$$

$$M=(N-1)/2 \qquad (17)$$

Using the Chinese remainder theorem (see Reference 6) it can be verified that expression (16) may bewritten in the form:

$$Y(u) = \tfrac{1}{2}\{B_1(u)H_1(u) \bmod(u^M-1)\} (u^M + 1) + \qquad (18)$$
$$-\tfrac{1}{2}\{B_2(u)H_2(u) \bmod(u^M + 1)\} (u^M - 1)$$

wherein $$B_1(u) = B(u) \bmod(u^M - 1) = \sum_{q=1}^{M} b_1(q)u^{q-1} \qquad (19a)$$

$$B_2(u) = B(u) \bmod(u^M + 1) = \sum_{q=1}^{M} b_2(q)u^{q-1}$$

-continued $$H_1(u) = H(u) \bmod(u^M - 1) = \sum_{r=1}^{M} h_1(r) u^{r-1} \quad (19b)$$

$$H_2(u) = H(u) \bmod(u^M + 1) = \sum_{r=1}^{M} h_2(r) u^{r-1}$$

From these expressions (19a) and (19b) it can now be derived that:

$$\begin{aligned}
b_1(q) &= b(q) + b(M+q) \\
b_2(q) &= b(q) - b(M+q) \\
h_1(r) &= h(r) + h(M+r) \\
h_2(r) &= h(r) - h(M+r)
\end{aligned} \quad (20)$$

for r, q = 1,2,3, ... M

In expression (20) it is indicated that the coefficients of the polynominals $B_1(u)$ and $B_2(u)$ are linear combinations of the original, permuted signal values. Also the coefficients of the polynominals $H_1(u)$ and $H_2(u)$ are linear combinations of the original filter coefficients. As from expression (11) it follows that:

$$h(r) = E^{g^r} \quad (21)$$

then it holds that:
$$h(M+r) = E^{g^{(M+r)}} \quad (22)$$

Using the expressions (8a), (21) and (22) it follows from (20) that, for $E = \exp(-j2\pi/N)$, $$h_1(r) = 2 \cos(2\pi g^r/N)$$
$$h_2(r) = -2j \sin(2\pi g^r/N) \quad (23)$$

and that for $$E = \exp(+2j\pi/N),$$
$$h_1(r) = 2 \cos(2\pi g^r/N)$$
$$h_2(r) = +2j \sin(2\pi g^r/N) \quad (23a)$$

Stating that:

$$Y_1(u) = B_1(u) H_1(u) \bmod(u^M - 1) = \sum_{p=1}^{M} y_1(p) u^{p-1} \quad (24)$$

$$Y_2(u) = B_2(u) H_2(u) \bmod(u^M + 1) = \sum_{p=1}^{M} y_2(p) u^{p-1}$$

then it follows from (18) that:

$$Y(u) = \tfrac{1}{2}(u^M + 1) Y_1(u) + -\tfrac{1}{2}(u^M - 1) Y_2(u) \quad (25)$$

From the above it follows that the coefficients $y_1(p)$ of polynominal $Y_1(u)$ are obtained from the circular convolution:

$$y_1(p) = \sum_{q=1}^{M} b_1(q) h_1(1 + \{(p-q) \bmod M\}) \quad (26)$$

By substituting herein for $h_1(r)$ the values defined in (23) and (23a) then (26) becomes:

$$y_1(p) = \sum_{q=1}^{M} 2 b_1(q) \cos\left(\frac{2\pi}{N} g^{1+\{(p-q) \bmod M\}}\right) \quad (26a)$$

It can now further be verified that the coefficients $y_2(p)$ of $Y_2(u)$ follows from the equation:

$$y_2(p) = \sum_{q=1}^{p} b_2(q) h_2(1 + \{(p-q) \bmod M\}) + \quad (27)$$

$$- \sum_{q=p+1}^{M} b_2(q) h_2(1 + \{(p-q) \bmod M\})$$

As well as expression (26) this expression (27) also describes a circular convolution in which, however, the polarity of those signal values $b_2(q)$ whose number is larger than or equal to p+1 must be inverted.

From (24) and (25) it now further follows that it holds that the coefficients of Y(u) satisfy the following expressions:

$$\begin{aligned}
y(p) &= \tfrac{1}{2}\{y_1(p) - y_2(p)\} \\
y(M + p) &= \tfrac{1}{2}\{y_1(p) + y_2(p)\} \\
\text{for } p &= 1, 2, 3, \ldots M
\end{aligned} \quad (28)$$

From equation (12) it will be clear that the circular convolution to be calculated in accordance with the Rader-algorithm requires N−1 complex signal values b(i) and N−1 complex filter coefficients.

In the method proposed here two circular convolutions are used which now, however, each require (N−1)/2 complex signal values $b_1(q)$ and $b_2(q)$, respectively, and (N−1)/2 filter coefficients which however are either purely real or purely imaginary.

Figure 5:
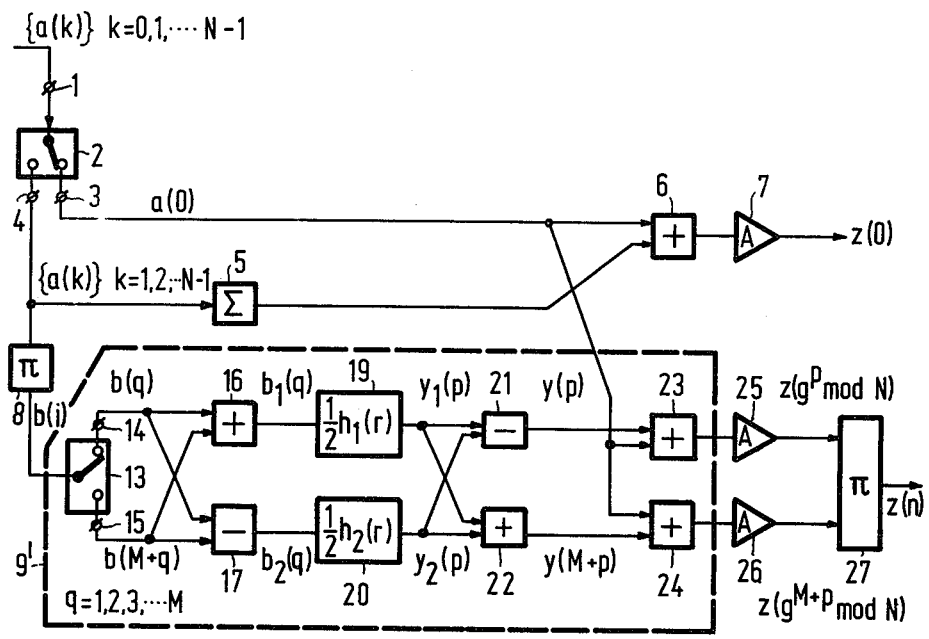
FIG. 5 shows a Discrete Fourier-transform arrangement whose structure is an implementation of the method according to the invention.

(4) A Discrete Fourier Transform Arrangement based on the method according to the invention An embodiment of a Discrete Fourier Transform arrangement which is an implementation of the method according to the invention, is schematically shown in FIG. 5. The arrangement shown there is implemented to a very great extent in the same manner as the arrangement shown in FIG. 4. In the arrangement of FIG. 5 the signal values b(i) produced by the permuting arrangement 8 are, however, processed in a completely different way than in the arrangement of FIG. 4. The arrangement shown in FIG. 5 comprises a conversion arrangement 9' including a switching arrangement 13, shown synmbolically only, which has two outputs denoted 14 and 15, respectively. Both outputs 14 and 15 are connected to inputs of an adder 16 and inputs of a subtracter 17. Adder 16 produces the signal values $b_1(q)$ defined in expression (20) and subtractor 17 produces the signal values $b_2(q)$, which are also defined in expression (20). The signal values $b_1(q)$ are applied to a circular non-recursive discrete filter 19 having the impulse response $\tfrac{1}{2}h_1(r)$ of length M = (N−1)/2. The signal values $b_2(q)$ are applied to a circular non-recursive discrete filter 20 having the impulse response $\tfrac{1}{2}h_2(r)$ of length M. These impulse responses $h_1(r)$ and $h_2(r)$ are defined by either expression (23) or expression (23a). Filter 19 produces the signal values $y_1(p)$ defined in expression (26) or (26a), and the filter 20 produces the signal values $y_2(p)$ defined in expression (27). The signal values $y_1(p)$ and $y_2(p)$ thus obtained are applied to both a subtracter 21 and an adder 22, which produce the signal values y(p) and y(M+p), respectively, in accordance with expression (28). The last-mentioned signal values are augmented by a(0) in adders 23 and 24, respectively. The sums thus obtained are multiplied by the factor A in the multipliers 25 and 26, respectively, resulting in the signal values $z(g^p \mod N)$ and $z(g^{M+P} \mod N)$. Just as described for the arrangement shown in FIG. 4, the signal values produced by the multipliers can be placed in the desired (proper!) sequence by means of the second permuting arrangement 27.

(5) Detailed embodiments of some components (5.1.) The permuting arrangements 8 and 27

Figure 6:
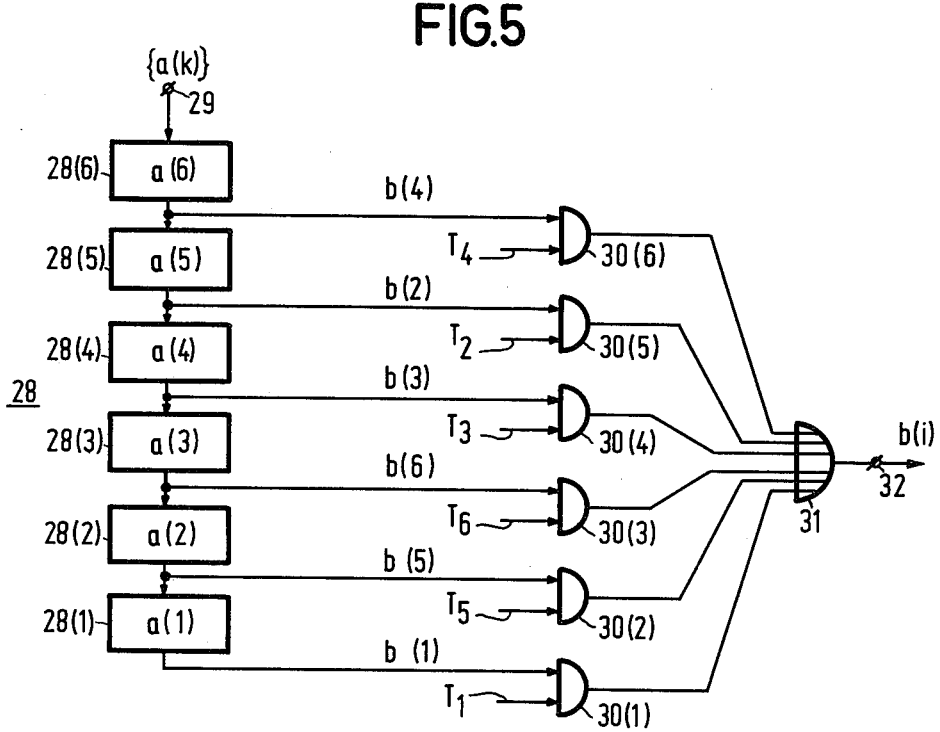
FIG. 6 shows an embodiment of the permuting arrangement 8, which serially produces the elements of the set $\{b(i)\}i=1,2,\ldots N-1$.

FIG. 6 shows an embodiment of the permuting arrangement 8, to which the values of the set $\{a(k)\}k=1, \ldots N$, are applied sequentially and which produces the elements of the set $\{b(i)\}i=1,2, \ldots N-1$, also sequentially. In this embodiment it is assumed that $N=7$ and that $g=3$. This permuting arrangement comprises a shift register 28 including six shift register elements 28(1)-28(6), which are each arranged for storing a signal value a(k). This shift register has an input 29, which is connected to the output 4 of the switching arrangement 2 of FIG. 5. The outputs of the shift register elements 28(.) are connected in the way shown in Figure to the output 32 of the permitting arrangement through AND-gate circuits 30(.) and an OR-gate circuit 31. These AND-gate circuits 30(.) receive control pulses $T_1, T_2, \ldots T_6$, which are each produced a period $T_0$ after one another and which can be generated in a way as described in, for example, Reference 9 on pages 75 and 76. More particularly it holds that when the control pulse $T_1$ occurs at an instant $t_0$ then control pulse $T_2$ occurs at an instant $t_0+T_0$ and $T_3$ at an instant $t_0+2T_0$ etc. With this mode of control it is achieved that at the output 32 of this permitting arrangement is produced:

$b(1)=a(1)$ at instant $t_0$;
$b(2)=a(5)$ at the instant $t_0+T_0$;

$b(3)=a(4)$ at the instant $t_0+2T_0$;

$b(4)=a(6)$ at the instant $t_0+3T_0$;

$b(5)=a(2)$ at the instant $t_0+4T_0$;

$b(6)=a(3)$ at the instant $t_0+5T_0$.

Figure 7:
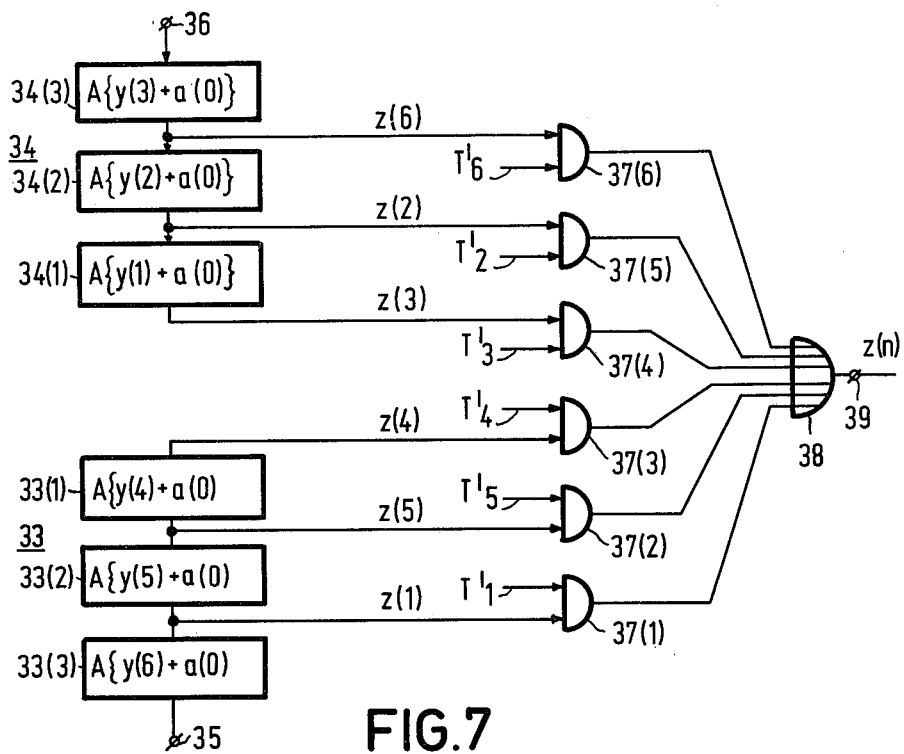
FIG. 7 shows an embodiment of the permuting arrangement 27 which serially produces the elements of the set $\{z(n)\}n=1,2,\ldots N-1$.
Figure 8:
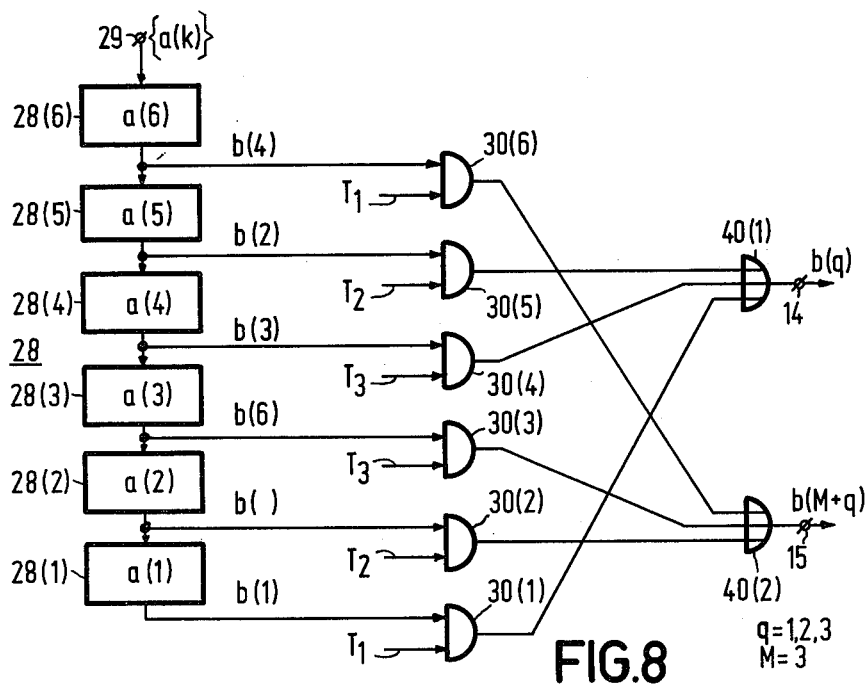
FIG. 8 shows a combination of the permuting arrangement 8 and the switching arrangement 13 of FIG. 5.

The permuting arrangement 27 may be implemented in a manner which largely corresponds to the permuting arrangement shown in FIG. 6. An embodiment of this permuting arrangement 27 is shown in FIG. 7. It is again assumed that $N=7$ and $g=3$ and that the data elements z(n) of the set $\{z(n)\}n=1,2, \ldots N-1$ occur sequentially. This permuting arrangement 27 comprises two shift register 33 and 34, each including three shift register elements 33(1)-33(3) and 34(1)-34(3), respectively, each of these shift register elements being arranged for storing a data element $A\{y(m)+a(0)\}$. Shift register 33 has an input 35 connected to the output of multiplier 26. Shift register 34 has an input 36, connected to the output of multiplier 25. As shown in the Figure, the outputs of the shift register elements 33(.) and 34(.) are connected to the output 39 of the permuting arrangement through AND-gate circuits 37(.) and an OR-gate circuit 38. Control pulses $T'_1, T'_2 \ldots T'_6$ which each occur a period $T'_0$ after one another are now applied to the AND-gate circuits 37(.). When control pulse $T'_1$ occur at instant $t'_0$, then $T'_2$ occurs at instant $t'_0+T'_0$ and $T'_3$ at instant $t'_0+2T'_0$, etc. Also these control pulses may be generated in the way described in Reference 9. With this mode of control it is achieved that at the output 39 of this permuting arrangement there is produced:

$z(1)=A\{y(6)+a(0)\}$ at the instant $t'_0$ $z(2)=A\{y(2)+a(0)\}$ at the instant $t'_0+T'_0$ $z(3)=A\{y(1)+a(0)\}$ at the instant $t'_0+2T'_0$ $z(4)=A\{y(4)+a(0)\}$ at the instant $t'_0+3T'_0$ $z(5)=A\{y(5)+a(0)\}$ at the instant $t'_0+4T'_0$ $z(6)=A\{y(3)+a(0)\}$ at the instant $t'_0+5T'_0$ In practice, it is advantageous to combine the function of the permuting arrangement 8 and the function of the switching arrangement 13; for example in the way shown in greater detail in FIG. 8. This combined permuting-switching arrangement, shown in FIG. 8, is implemented to a very great extent in the same manner as the permuting arrangement shown in FIG. 6. Elements in FIG. 8 corresponding to elements in FIG. 6 have the same reference numerals as in FIG. 6. The arrangement shown in FIG. 8 differs from the arrangement shown in FIG. 6 in the following respects:

The combined permuting-switching arrangement comprises two OR-gate circuits 40(1) and 40(2), whose outputs correspond to the outputs 14 and 15 respectively, of the switching arrangement 13 of FIG. 5. Inputs of OR-gate circuit 40(1) are connected to outputs of the AND-gate circuits 30(1), 30(4), 30(5), while inputs of OR-gate circuit 40(2l) are connected to outputs of the AND-gate circuits 30(2), 30(3), 30(6).

With this combined permuting-switching arrangement the AND-gate circuits 30(.) are controlled only by the three control signals $T_1, T_2, T_3, T_1$ being applied to the AND-gate circuits 30(1) and 30(6), $T_2$ being applied to the AND-gate circuits 30(2) and 30(5), and $T_3$ being applied to the AND-gate circuits 30(3) and 30(4). This mode of control results in that the signal value b(q) appears at output 14 and simultaneously therewith the signal value b(M+q) at the output 15.

It should be noted that a permuting arrangement may also be realized by means of a RAM (random access memory). The signal values applied to this RAM are then entered in storage locations which are addressed by a counter. The address code required to read the signal values may be generated by a ROM.

A permuting arrangement which is particularly suitable for processing "sampled data" signals is described in detail in Reference 5.

(5.2) The circular filters 19 and 20

Figure 9:
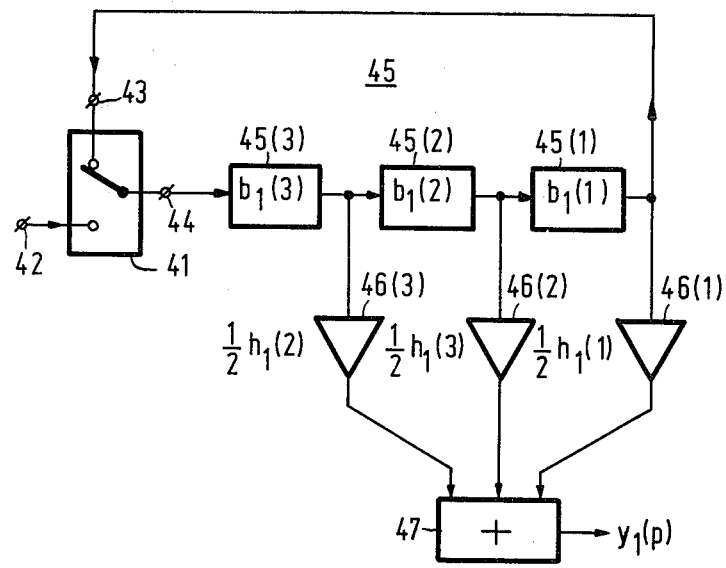
FIG. 9 shows an embodiment of the circular filter 9 shown in FIG. 5.

An embodiment of the circular filter 19 is shown in greater detail in FIG. 9. The discrete filter shown there is in the form of a transversal filter and comprises a switching arrangement 41, shown symbolically having an input 42 and an input 43 as well as an output 44. The input 42 is connected to the output of the adder 16. A shift register 45 which, in the case considered here for $N=7$ and $g=3$, comprises three shift register elements 45(.), each arranged for storing a data element $b_1(q)$, is connected to the output 44. Via a multiplier 46(.) having the fixed filter coefficients $\frac{1}{2}h_1(.)$, the output of each shift register element 45(.) is connected to an input of an adder 47, which thus produces the desired data element $y_1(p)$. The circular character of this filter is obtained in that the output of the shift register element 45(1) is also connected to the input 43 of the switching arrangement 41.

The filter shown in FIG. 9 operates as follows. At at instant $t_0-\tau$, in which $\tau$ is much smaller than the period $T_0$ defined in paragraph f(5.1), the output 44 of switching arrangement 41 is connected to its input 42. At the instant $t_0$ the signal value $b_1(1)$ is applied to this input, and written into the shift register element 45(3). At the instant $t_0+T_0$ the signal value $b_1(2)$ is applied to input 42 and written into the shift register element 45(3), while simultaneously the signal value $b_1(1)$ is shifted to the shift register element 45(2). At the instant $t_0+2T_0$ the signal value $b_1(3)$ is applied to the input 42 and written into the shift register element 45(3) while simultaneously the signal value $b_1(2)$ is shifted to the shift register element 45(2) and the signal value $b_1(1)$ to the shift register element 45(1). The signal values stored thus, are now multiplied in a manner customary for transversal filters by the associated filter coefficients $\frac{1}{2}h_1(1)$, $\frac{1}{2}h_1(3)$ and $\frac{1}{2}h_1(2)$ and the products obtained are accumulated in adder 47. The content of the shift register 45 being as shown in the Figure, the adder 47 produces the signal value $y_1(1)$.

At an instant located between the instant at which the signal value $b_1(3)$ is written into the shift register 45 and the instant at which the above-mentioned signal value $y_1(1)$ is produced, the output 44 of the switching arrangement 41 is connected to its input 43. After the adder 47 has produced the signal value $y_1(1)$ the content of the shift register 45 is shifted one position to the right, causing $b_1(1)$ to be stored in the element 45(3), $b_1(3)$ to be stored in the element 45(2) and $b_1(2)$ to be stored in the element 45(1). With the signal values stored thus, the adder 47 produces the signal value $y_1(2)$. Thereafter the content of the shift register 45 is again shifted one position to the right, thus causing signal value $b_1(3)$ to be stored in shift register element 45(1), data element $b_1(1)$ to be stored in shift register element 45(2) and data element $b_1(2)$ to be stored in shift register element 45(3). With the signal values stored thus the adder 47 produces the signal value $y_1(3)$. This operation is then repeated, but now with a new set of three signal values $\{b_1(q)\}q=1,2,3$.

Figure 10:
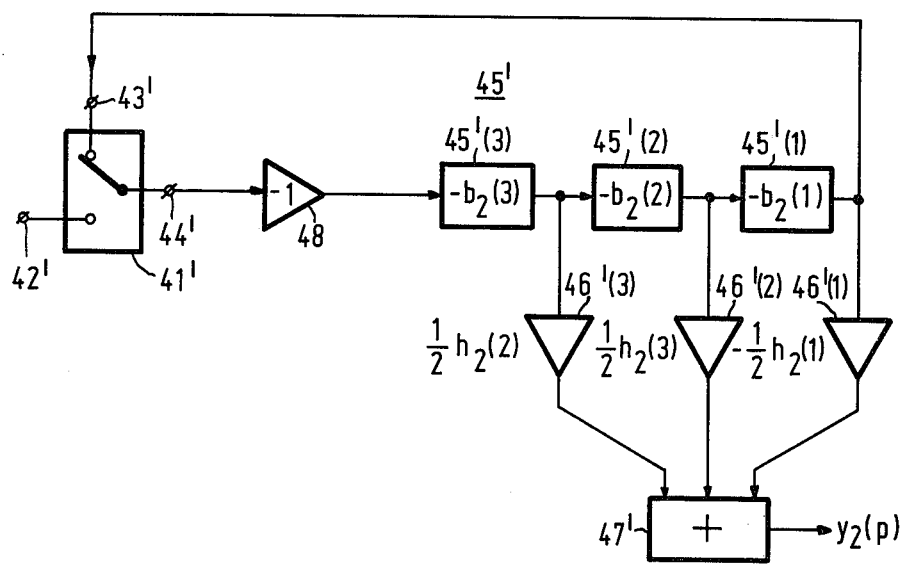
FIG. 10 shows an embodiment of the circular filter 20 shown in FIG. 5.

The circular filter 20, which has the impulse response $\frac{1}{2}h_2(r)$ and which produces the signal values $y_2(p)$ defined in expression (27), may be implemented in substantially the same manner as the circular filter 19. FIG. 10 shows an embodiment of this circular filter 20, which is implemented to a very great extent in a similar way as the circular filter shown in FIG. 9. In FIG. 10 elements corresponding to elements already shown in FIG. 9 have been given the same reference numerals as in FIG. 9, now however provided with an accent notation. The circular filter shown in FIG. 10 differs from the filter shown in FIG. 9 in that the output 44' of the switching arrangement 41' is connected to the input of shift register 45' through a multiplying device 48. This multiplying device 48 has the constant multiplication factor $-1$. Further, the multiplication factor of the multiplier 46'(1) is now equal to $\frac{1}{2}h_2(1)$, that of multiplier 46'(2) to $\frac{1}{2}h_2(3)$ and that of the multiplier 46'(3) is equal to $\frac{1}{2}h_2(2)$.

(5.3.) An alternative structure

The embodiments described in paragraph (5.1) are based on the assumption that the signal values $b(i)$ are sequentially produced by the permuting arrangement. If it is allowed that the permuting arrangement produces all signal values $b(i)$ of the set $\{b(i)\}i=1,2,\ldots N-1$ simultaneously (and therefore in parallel form) then the function of the permuting arrangement 8, the switching arrangement 13 the adder 16, the subtracter 17, the circular filter 19 and the circular filter 20 can be realized by means of the circuit arrangement which is shown schematically in FIG. 11. Herein, the permuting arrangement 8 is again formed by the shift register 28 having the shift register elements 28(.). The input 29 of this shift register is again connected to the output 4 of switching arrangement 2 (see FIG. 5). The outputs of the shift register elements 28(.) are connected in the way shown in the Figure to inputs of AND-gate circuits 49(.). These AND-gate circuits all receive simultaneously a control pulse T at an instant $t_0$, in response to which they produce the set of signal values $\{b(i)\}i=1,2,\ldots N-1$. The data elements $b(i)$ which are then simultaneously available are applied in the way shown in the Figure to the three subtracters 17(.) and the three adders 16(.), which produce the set of signal values $\{b_2(q)\}q=1,2,3$ and $\{b_1(q)\}q=1,2,3$, respectively. The set of signal values $b_1(q)$ is directly applied to the circular filter 19', which is predominantly implemented in the way shown in FIG. 9. Via multipliers 50(.), each having a multiplication faster $-1$ the set of signal values $\{b_2(q)\}$ is applied to the circular filter 20', which is predominantly implemented in the way shown in FIG. 10. For the circular filters 19' and 20' shown in FIG. 11 the shift register elements 45(.) and 45A'(.) are of the type having a preset input S (alternatively denoted Set-input) via which a signal value can be written into the shift register element.

It should be noted that the filters 19 and 20 and also 19' and 20' may alternatively be implemented in the way which is extensively described on pages 541-556 of Reference 11.

It should also be noted that when all the signal values $a(k)$ are real, then $y_1(p)$ form the real and $y_2(p)$ forms the imaginary part of $y(p)$ and $y(M+p)$, so that for example the subtracter 21 and the adder 22 may be omitted. Also the adders 23 and 24 can now be simplified as $a(0)$ needs only be added to the real data element $y_1(p)$.

In practice it will, however, frequently be the case that the adders 23 and 24 are completely absent, as the addition of $a(0)$ to $y(p)$ and $y(M+p)$ introduces only a, in many cases uninteresting, level shift so that in practice there is often only an interest to known the quantity $z(n)-Aa(0)$.

In practice the discrete Fourier transform arrangement is often used for spectrum analysis. This results in that in practice there is no need to known $z(n)$ or, possibly $z(n)-Aa(0)$, but only to known the square of the modulus of $z(n)$ or $z(n)-Aa(0)$. When all signal values $a(k)$ are real, this means that there is only an interest in the square of the modulus of $y_1(p)$ increased by the square of the modulus of $y_2(p)$, so that the elements 21 to 27 may be dispensed with.

What is claimed is:

1. A method of performing the discrete Fourier transform on an input array of N input signal values $a(k)$, k=0, 1, 2, ... N−1, wherein N is a prime, the metod comprising the steps of:

separating the input signal value a(0) from said input array of N input signal values to generate a modified input array of N−1 input signal values consisting of the input signal values a(1), a(2), ... , a(N−1);

permuting said modified input array of N−1 input signal values to generate a permuted array of N−1 permutation signal values b(i), i=1, 2, ... N−1, such permutation signal value b(i) being equal to input signal value $a(g^{N-i} \mod N)$, wherein g is a positive integer which is equal to a primitive root of a field consisting of the numbers 1, 2, 3, ... , N−1;

processing said permuted array by adding and substracting first and second signal values selected from said permuted array to produce first and second intermediate arrays of M intermediate first and second signal values $b_1(q)$ and $b_2(q)$ respectively, wherein:

$m=(N-1)/2$ $q=1, 2, 3, ..., M$ $b_1(q)=b(q)+b(M+q)$ $b_2(q)=b(q)-b(M+q)$ converting the first intermediate array of M intermediate first signal values $b_1(q)$ into a first auxiliary array of M auxiliary first signal values $y_1(p)$, p=1, 2, 3, ... M, wherein $$y_1(p) = \alpha \sum_{q=1}^{M} b_1(q) \cos\left(\frac{2\pi}{N} g^{1+\{(p-q)\mod M\}}\right),$$

in which α represents a constant;

converting the second intermediate array of M intermediate second signal values $b_2(q)$ into a second auxiliary array of M auxiliary second signal values $y_2(p)$, wherein:

$$y_2(p) = j\beta \sum_{q=1}^{p} b_2(q) \sin\left(\frac{2\pi}{N} g^{1+\{(p-q)\mod M\}}\right), +$$

$$-j\beta \sum_{q=p+1}^{M} b_2(q) \sin\left(\frac{2\pi}{N} g^{1+\{(p-q)\mod M\}}\right),$$

in which β represents a constant and wherein $j=\sqrt{-1}$;

processing said first and second auxiliary arrays of M auxiliary first and second signal values to generate an output array of N−1 output signal values z(n)−Aa(0), n−1, 2, 3, ... N−1 which are each proportional to the discrete Fourier transform of the array of N input signal values and which are defined by the relation $z(n)-Aa(0)=y_1(p)+(-1)^S y_2(p)$ wherein S=+1, for n=gP mod N.
S=0, for n=gM+p mod N.
A being a constant.

2. A process for performing a discrete Fourier transformation on an input array of N input signal values a(k), k=0, 1, 2, ... , N−1, wherein N is a prime, to derive an output array of at most N output signal values representative of the frequency transformation of said input array, said processor comprising:

means for separating the input signal value a(0) from said input array of N input signal values to generate a modified input array of N−1 input signal values consisting of the input signal values a(1), a(2), ... a(N−1);

permuting circuit for permuting the N−1 input signal values of the modified input array to produce a permuted array of N−1 permutation signal values b(i), i=1, 2, ... , N−1, each such permutation signal value b(i) being equal to an input signal value $a(g^{N-1} \mod N)$, wherein g is a positive integer which is equal to a primititive root of a field consisting of the numbers 1, 2, 3, ... N−1;

an intermediate processing circuit for adding and subtracting first and second permutation signal values selected from said permuted array to produce first and second intermediate arrays of M intermediate first and second signal values $b_1(q)$ and $b_2(q)$ respectively, wherein $M=(N-1)2$ $q=1, 2, 3, ... M$ $b_1(q)=b(q)+b(M+q)$ $b_2(q)=b(q)-b(M+q)$ a first conversion circuit for converting the first intermediate array of M intermediate first signal values $b_1(q)$ into a first auxiliary array of M auxiliary first signal values $y_1(p)$, p−1, 2, 3, ... M, wherein the relation between each auxiliary first signal value $y_1(p)$ and the M intermediate first signal values $b_1(q)$ is given by the expression:

$$y_1(p) = \alpha \sum_{q=1}^{M} b_1(q) \cos\left(\frac{2\pi}{N} g^{1+\{(p-q)\mod M\}}\right),$$

in which α represents a constant;

a second conversion circuit for converting the second intermediate array of M intermediate second signal values $b_2(q)$ into a second auxiliary array of M auxiliary second signal values $y_2(p)$, wherein the relation between each auxiliary second signal value $y_2(p)$ and the M intermediate second signal values $b_2(q)$ is given by the expression:

$$y_2(p) = j\beta \sum_{q=1}^{p} b_2(q) \sin\left(\frac{2\pi}{N} g^{1+\{(p-q)\mod M\}}\right), +$$

$$-j\beta \sum_{q=p+1}^{M} b_2(q) \sin\left(\frac{2\pi}{N} g^{1+\{(p-q)\mod M\}}\right),$$

in which β represents a constant and wherein $j=\sqrt{-1}$;

an output processing circuit for adding to each auxiliary first signal value $y_1(p)$ a weighted version of a selected one of the auxiliary second signal values $y_2(p)$ to produce an output array of N−1 output signal values z(n)−Aa(0), n−1, 2, 3, ... N−1 which are each proportional to the discrete Fourier transform of the input array of N input signal values and which satisfy the expression:

$$z(n) - Aa(0) = y_1(p) + (-1)^S y_2(p)$$

wherein
$S = +1$ for $n = g^p \bmod N$
$S = 0$ for $n = g^{M+p} \bmod N$
A being a constant.

3. An arrangement as claimed in claim 2, characterized in that each of the first and the second conversion circuits comprises a circular discrete filter having an impulse response of length M.

* * * * *